(12) United States Patent
Banister

(10) Patent No.: US 9,381,486 B2
(45) Date of Patent: Jul. 5, 2016

(54) FISCHER TROPSCH REACTOR

(75) Inventor: James Banister, Aberdeen (GB)

(73) Assignee: Gas2 Limited, Aberdeen (GB)

( * ) Notice: Subject to any disclaimer, the term of this patent is extended or adjusted under 35 U.S.C. 154(b) by 41 days.

(21) Appl. No.: 14/131,927

(22) PCT Filed: Jul. 13, 2012

(86) PCT No.: PCT/GB2012/051668
§ 371 (c)(1),
(2), (4) Date: Feb. 6, 2014

(87) PCT Pub. No.: WO2013/008029
PCT Pub. Date: Jan. 17, 2013

(65) Prior Publication Data
US 2014/0147345 A1    May 29, 2014

Related U.S. Application Data

(63) Continuation of application No. PCT/GB2012/051668, filed on Jul. 13, 2012.

(30) Foreign Application Priority Data

Jul. 13, 2011  (GB) .................................. 1112028.4

(51) Int. Cl.
*B01J 16/00*    (2006.01)
*B01J 21/00*    (2006.01)
(Continued)

(52) U.S. Cl.
CPC .............. *B01J 16/005* (2013.01); *B01J 12/007* (2013.01); *B01J 19/249* (2013.01);
(Continued)

(58) Field of Classification Search
CPC .......... B01J 12/00; B01J 12/007; B01J 16/00; B01J 16/005; B01J 21/00; B01J 21/005; B01J 21/04; B01J 23/70; B01J 23/89; B01J 23/8913; B01J 35/00; B01J 35/002; B01J 35/0046; B01J 35/0066; B01J 35/02; B01J 35/023; B01J 35/04; B01J 37/00; B01J 37/02; B01J 37/0201; B01J 37/0215; B01J 37/0219; B01J 37/0221; B01J 37/024; B01J 37/0249; B01J 2219/24–2219/2411; B01J 2219/2422–2219/2428; B01J 2219/2441–2219/2445; B01J 2231/60; B01J 2231/64; B01J 2231/641; B01J 2231/648; C10G 2/00; C10G 2/30; C10G 2/32–2/341
See application file for complete search history.

(56) References Cited

U.S. PATENT DOCUMENTS 7,096,931 B2 *  8/2006  Chang et al. ................... 165/133
7,776,933 B2 *  8/2010  Gimpel et al. ................. 518/715
(Continued)

FOREIGN PATENT DOCUMENTS

WO    WO-2006/037776    4/2006
WO    WO-2007/008495    1/2007
(Continued)

OTHER PUBLICATIONS

International Search Report for PCT/GB2012/051668 mailed Dec. 12, 2012.

*Primary Examiner* — Natasha Young
(74) *Attorney, Agent, or Firm* — Brinks Gilson & Lione

(57) ABSTRACT

There is herein described a Fischer-Tropsch reactor. More particularly, there is described a Fischer-Tropsch reactor that incorporates forced flow through a small pore, thick layer, monolith supported catalyst and high levels of heat transfer that is able to operate with high levels of catalyst effectiveness. The catalyst bed (103) is supported on a distinct porous structure (101) through which the syn-gas flow is forced and the catalyst layer has a thickness of more than 200 microns.

3 Claims, 12 Drawing Sheets

(51) Int. Cl.
*B01J 21/04* (2006.01)
*B01J 23/70* (2006.01)
*B01J 23/89* (2006.01)
*B01J 35/00* (2006.01)
*B01J 35/02* (2006.01)
*B01J 35/04* (2006.01)
*B01J 37/00* (2006.01)
*B01J 37/02* (2006.01)
*B01J 12/00* (2006.01)
*C10G 2/00* (2006.01)
*B01J 19/24* (2006.01)

(52) U.S. Cl.
CPC ......... *B01J 19/2485* (2013.01); *B01J 23/8913* (2013.01); *B01J 35/0066* (2013.01); *B01J 35/023* (2013.01); *B01J 37/0219* (2013.01); *B01J 37/0221* (2013.01); *B01J 37/0248* (2013.01); *C10G 2/332* (2013.01); *C10G 2/341* (2013.01); *B01J 21/04* (2013.01); *B01J 35/04* (2013.01); *B01J 2219/2404* (2013.01); *B01J 2219/2406* (2013.01); *B01J 2219/2407* (2013.01); *B01J 2219/2411* (2013.01); *B01J 2219/2424* (2013.01); *B01J 2219/2428* (2013.01); *B01J 2219/2438* (2013.01); *B01J 2219/2445* (2013.01); *B01J 2219/2448* (2013.01)

(56) References Cited

U.S. PATENT DOCUMENTS 8,057,744 B2 * 11/2011 Onishi et al. .................. 422/140
2014/0107233 A1 * 4/2014 Banister ........................ 518/703

FOREIGN PATENT DOCUMENTS

| WO | WO-2007/068732 | 6/2007 |
| WO | WO-2012/13185 | 10/2012 |

* cited by examiner

FISCHER TROPSCH REACTOR

CROSS REFERENCE TO RELATED APPLICATIONS

This application claims priority to PCT Application Number PCT/GB2012/051668, with an international filing date of Jul. 13, 2012, which claims priority to Great Britain Patent Application No. 1112028.4 filed on Jul. 13, 2011, each of which is herein incorporated by reference in its entirety.

FIELD OF THE INVENTION

The present invention relates to a Fischer-Tropsch reactor. More particularly, the present invention relates to a Fischer-Tropsch reactor that incorporates forced flow through a small pore, thick layer, monolith supported catalyst that incorporates high levels of heat transfer and that is able to operate with high levels of catalyst effectiveness.

BACKGROUND OF THE INVENTION

Gas to Liquids processes that combine a reforming technology for production of synthesis gas with a Fischer-Tropsch process are well known. A variety of reforming technologies and Fischer-Tropsch reactor technologies are available and have differing efficiencies, complexities, scalabilities and costs. Three main technologies for the reforming of synthesis gas are known and they are steam reforming, autothermal reforming and catalytic partial oxidation. For the largest scale processes the reforming technology of choice is usually autothermal reforming as this produces the highest levels of thermal efficiency, operates with the lowest amount of steam and is the most straightforward for building in high capacity single trains for large world scale plants. This is typically combined with a slurry phase Fischer-Tropsch process utilising a cobalt catalyst. The description of the development of these technologies is well documented in texts such as A. P. Steynberg and M. E Dry, Fischer-Tropsch Technology, v 152, Studies in Surface Science and Catalysis, which is incorporated herein by reference.

While the drivers for world scale plants is to achieve competitive pricing through the construction of ever larger plants the high levels of capital investment that are required for such large plants predicates that the plant must be built at large gas reserves capable of producing high rates of gas for many years: fields larger than 1 TcF.

However, much of the world's gas resources are contained within smaller widely separated fields where there is insufficient gas to provide a return on a large scale costly plant. In these circumstances the challenge is to produce a reduced cost plant that is optimised for manufacturing on a small scale with the minimum number of process units.

The concept of a simplified gas to liquids process has been discussed in a series of papers including "A new concept for the production of liquid hydrocarbons from natural gas in remote areas" by K Hedden, A. Jess and T Kuntze, Oil Gas—European Magazine 1994, which is incorporated herein by reference.

The challenge of building large Fischer-Tropsch Reactors is well described in the book by Steynberg and Dry. For the largest scales the difficulties of producing tube sheets with diameters of several meters impacts on the cost and so part of the benefit for slurry bed technology comes from the ease of fabrication of the largest reactors. At the smaller levels of production the reactor complexity can be increased at relatively little incremental cost as the fabrication challenges are lower.

Furthermore where the plants are located in highly remote locations including offshore there are further problems that are hard to solve. For example, while fixed bed Fischer Tropsch reactors provide a good solution with large plants there is a compromise between minimising pressure drop to avoid crushing of the catalyst and excessive compression costs and maintaining a high enough velocity to ensure good heat transfer. The result is a pelleted catalyst of dimensions around 1 mm or more, which suffers a loss of 30% or more of its inherent activity dues to poor catalyst effectiveness attributed to internal mass transfer limitations. The fixed bed reactors must also be tall to ensure high enough velocity through the bed to provide sufficient levels of heat and mass transfer. This presents difficulties in packaging the reactor for transport to the site and issues of gas-liquid distribution if the reactor is moving while located offshore. Egg-shell catalysts have been proposed that locate the cobalt solely in the surface of the catalyst pellet and although this reduces the amount of unused cobalt it is expensive to manufacture and fails to increase the productivity of the reactor.

The challenges of heat transfer, mass transfer and volumetric efficiency for the Fischer-Tropsch reactor design is well described in the paper R. Guettel, T. Turek, Comparison of different reactor types for low temperature Fischer-Tropsch synthesis: A simulation study, Chemical Engineering Science, 64, (2009), 955-964, incorporated herein by reference, which illustrates the advantages and potential of the various technologies that are available for hydrocarbon liquid synthesis. While it is relatively straightforward to produce a cobalt catalyst for Fischer-Tropsch hydrocarbon production that can operate efficiently on the scale of a few grammes of catalyst, this paper highlights the challenges of producing a reactor design capable of maintaining this performance at a commercial scale. Inherently a fixed bed of catalyst cannot operate with high cobalt efficiency unless particles of less than 200 microns are used. However utilising small particles requires using low gas velocities and very short catalyst beds if an excessive pressure drop is to be avoided. This results in poor heat transfer capabilities if the catalyst is simply packed within conventionally sized tubes of 25 mm diameter. The alternative would appear to be to coat the surface of a plate style reactor with particles of catalyst While this solves the problem of the heat transfer and provides more heat transfer surface than is actually needed the construction methods of these types of reactor require that the process gas plus catalyst occupies typically 40% or less of the total reactor volume. Taking into account the manifolding and any pressure containing shell that is require can result in a very low volumetric efficiency of catalyst packing and a high specific reactor capital cost. Some of this loss in efficiency can be recovered through operating the catalyst at higher temperature and with a higher inherent efficiency, but this can result in a reduced catalyst life and lower selectivities to desired hydrocarbon product. It is possible to improve the volumetric loading of the reactor through the use of larger channels within a microchannel device and to then place gas permeable inserts within the channels. For example WO/2004/050799 describes a thin layer of catalyst applied to multi-layer gas permeable structures within micro channels. However thin layers of catalyst, typically 200 micron or less, are still used in order to maintain the catalyst efficiency. There is no sealing provided around the catalyst structures such that the flow of gas is forced (convective) flow through the porous supports. Instead there is only convective flow across the surface of the supports; the gases must diffuse through the thin layer of support and catalyst. While not wishing to be bound by theory it is thought that the lack of forced flow through the porous structure that results in the necessity of only using thin layers of catalyst.

The same restriction is described in other high activity configurations of Fischer-Tropsch catalyst. For example in US 2006/0167120 a high activity catalyst on porous support is described that again proposes a catalyst layer structure where the layer must be 200 microns or less to deliver a high activity catalyst. Without sealing being provided such that there is forced flow through the porous support the system relies solely on diffusion for the gases to reach the catalyst active sites.

Whatever the form of the reactor in the prior art it appears that the restriction on dimensions of the layer exists. Even with slurry reactors that utilise freely moving particles such as in US 2003/0211940 and the catalyst is formed by placement of cobalt on a porous support there still remains a requirement to avoid a thick layer of catalyst if high cobalt activity is to be achieved. This is again because no forced flow through the porous structure is achieved.

The perceived importance of utilizing a thin layer is exemplified in EP 2341120 A1 where by flow of air through the porous support is used in the catalyst manufacturing method to remove excess catalyst and keep the layers within the structure less than 100 microns. Again the reasoning is that it is not possible to utilize a catalyst on a porous support with thick layers.

One alternative proposed that allows a high activity bed to be developed is to use a structured catalyst such as described in Itenberg et al. US2005/0032921/A1, incorporated herein by reference, which utilises a high permeability cylindrical structure with a typical equivalent fixed bed depth of approximately 5 mm. The gas is forced through the porous structure which allows the catalyst to operate without severe mass transfer restrictions. The thermal conductivity of the fused catalyst structure is sufficient to avoid temperatures differentials of more than 5 deg C. building up across the membrane structure.

This goes some way to illustrate the method by which the cobalt structure can be incorporated within the reactor to maintain the cobalt catalyst efficiency but there are several problems with the approach presented.

The solution presented utilises the catalyst material as part of the structural support. It is now well known that even within complex cobalt based catalyst formulations that the catalytic species is simply the metallic cobalt. The presence of other components are there simply to either aid in the production of the optimum size of metallic cobalt crystallite, aid the reducibility of the crystallite produced or to inhibit reaction of the crystallite with the supporting oxide, particularly where aluminum is present. Despite this the correct combination of cobalt, promoters and stabilisers on the supporting oxide is critical in producing an active catalyst. One limitation on slurry phase catalysts is that the formulation must further take into account mechanical strength to produce an attrition resistant catalyst. Similarly the incorporation of the cobalt materials into the main body of the catalyst described by Itenberg et al. is that the catalyst formulation used must be one that can be fused to produce a support structure that is mechanically strong enough to be utilised within a commercial reactor. The problem of producing high mechanical strength catalysts that are capable of surviving either slurry phase attrition or the forces associated with the high pressure drops and packing stresses of a fixed bed process. Additionally sufficient porosity must be maintained in the support structure to accommodate a high concentration of the catalyst material. This further compromises the mechanical integrity of the supporting material.

The requirement to use a thermally conducting catalyst to enable good thermal control of the thick catalyst structure also places limitations on the formulation of the catalyst material, restricting access to the highest activity formulations currently described in the literature.

Additionally the permeability of the catalyst structure is maintained at a very high value to minimise resistance to flow attributed to the velocity of fluid through the pores. This results in a catalyst structure which is susceptible to preferential wetting. Where narrower pores become liquid filled there is a higher resistance to flow which will results in the gas preferentially travelling through the emptier pores reinforcing the effect. If the distance between gas paths exceeds the typically diffusion limiting distance of approximately 0.25 mm then the wetted area of catalyst will show much lower levels of activity due to reduced concentrations of carbon monoxide accessing the catalyst. The diffusion of hydrogen is much more facile than carbon monoxide and so the hydrogen concentration in these wetted areas will rise. The thicker the layer of the catalyst used then the higher the permeability of catalyst layer that is required, and the more susceptible the layer will be to channeling of the gas through the layers, producing a catalyst susceptible to localised loss of activity. This also results in a localised area of high methane production on the catalyst, which is highly undesirable.

Furthermore as the main catalyst body which provides the resistance to flow, that may aid good gas distribution, contains liquid producing cobalt catalyst as a part of normal function, then the loss of flow in any region will increase the local residence time leading to greater production of liquids, and greater resistance to flow. This instability severely limits the use of this technology.

Even once the problems of the mass transfer are resolved and measures are put in place to increase the heat transfer within the catalyst bed it is critical to remove the heat of reaction from the catalyst zone in an efficient manner. How this can be achieved is not described by Itenberg et. al. Intensifying the productivity of a monolith catalyst increased the intensity of the heat transfer required. Consequently it is most beneficial if the increased intensity of the catalyst productivity is accompanied by an increase in the available heat transfer duty. With monolith catalysts this is difficult as the heat transfer is typically provided by re-circulating fluid, with the high pumping costs required or use of multiple adiabatic beds with the associated reactor control problems.

Another alternative is the use of slurry bed technology where the catalyst particle is suspended within liquid product mixture agitated by the gas sparging, which while delivering a reactor that has a higher volumetric loading of cobalt within the reactor and high catalyst effectiveness through the use of small suspended particles suffers from the difficulties associated with catalyst attrition. The fine catalyst particles must be removed from the product solution utilising filtration, either internal or external to the reactor. These filters have a tendency to block as a result of the catalyst attrition inherent to the process. Additionally if the reactor is to be located offshore where much of the world's stranded gas resources are located and where small scale GTL is an attractive proposition to reduce flaring of gas then movement of the reactor can cause additional problems of liquid and gas distribution.

What is needed is a reactor design that enables a high heat transfer solution to be placed within a Fischer-Tropsch Reactor that enables a high catalyst efficiency to be maintained. It also requires a catalyst support structure that allows the formulations of cobalt catalyst that have high levels of reducibility and activity to be incorporated into the structure without the constraints of mechanical strength and thermal conductivity. Furthermore, to eliminate continuous catalyst replacement a fixed catalyst structure should be utilised. Additionally, achieving a high volumetric concentration of cobalt within the reactor needs to be achieved to produce a high productivity reactor.

Consequently there is a continuing search for a Fischer Tropsch reactor technology, particularly suitable for small scale and off-shore operation that can utilise the latest catalyst formulations in a highly efficient manner. It is an object of at least one aspect of the present invention to obviate or mitigate at least one or more of the aforementioned problems.

It is a further object of at least one aspect of the present invention to provide an improved fixed bed Fischer-Tropsch reactor.

It is a further object of at least one aspect of the present invention to a fixed bed Fischer-Tropsch reactor that incorporates forced flow through a small pore catalyst and high levels of heat transfer that is able to operate with high levels of catalyst effectiveness.

SUMMARY OF THE INVENTION

According to a first aspect of the present invention there is provided a reactor for converting synthesis gas in a Fischer-Tropsch process using a supported cobalt catalyst to produce heavy paraffins wherein the catalyst is supported on a porous structure through which the syngas flow is forced.

The porous structures and catalyst are substantially sealed across the reactor tube, tubes or channel The catalyst may be cobalt supported on alumina.

The porous support may contain less than 10 wt % cobalt.

The porous support may contain less than 5 wt % cobalt.

The supported catalyst layer may contain more than 10 wt % cobalt.

The supported catalyst layer may contains more than 15 wt % cobalt.

The geometric surface area of the catalyst support covered in catalyst is more than 0.1 m2/litre; more than 0.16 m2/litre; more than 0.2 m2/litre; more than 0.4 m2/litre more than 1.0 m2/litre;

The flow of syngas may be substantially through a porous support containing less than 10 wt % cobalt.

The catalyst layer may be more than 0.25 mm thick; more than 0.5 mm thick; more than 1.0 mm thick; more than 3.0 mm thick; less than 10 mm thick; less than 5 mm thick; less than 3 mm thick; less than 1 mm thick.

The catalyst support may form a distinct single internal surface with a geometric surface area greater than the cylinder within which it can be inscribed.

The catalyst support may form a planar cavity and
a. Where the planar cavity has at least one nozzle inlet
b. Where the planar cavity contains catalyst substantially covering at least one of the outer or inner surface forming the cavity
c. Where the heat transfer surface adjacent to the planar cavity is formed into a pressure vessel from the edge welding of plates, I by brazing, by compression within a frame or diffusion bonding of a channelled structure.

The syngas may travel further through the porous support pores than through the catalyst layer.

The porous support may form more than one internal channel.

The porous support may form more than 10 internal channels.

The porous support may form multiple channels where at least one of the channels has a hydraulic mean diameter greater than 5 mm.

The porous support may form multiple channels where at least one of the channels has a diameter greater than 10 mm.

The porous support may form at least one channel with a diameter less than 5 mm.

The porous support with multiple channels may be arranged such that flow from the previous support section is directed substantially to the largest channel of the following support section.

The porous support with multiple channels may be arranged such that flow from the previous support section is directed substantially to the largest channel of the following support section by blocking of the smaller channels at one end.

The heat transfer surface area may be increased by the use of longitudinal fins attached to the adjacent heat transfer surface.

The heat transfer surface area may be increases by the use of circumferential fins.

The heat transfer within a cylindrical catalyst support may be provided by a bayonet arrangement of heat transfer tubes.

A continuous layer of less than 1 mm thick with a pore size of less than 1000 nm substantially free of cobalt may be fixed to the catalyst support.

The hydrogen:carbon monoxide ratio may be from about 1.8:1 to 2.2:1.

The catalyst and porous support may be contained within tubes of less than 60 mm diameter.

The catalyst and porous support may be placed between heat transfer tubes of less than 60 mm diameter.

The cobalt catalyst within the Fischer-Tropsch Reactor may be supported by a porous ceramic structure which has a characteristic pore size greater than 500 nm.

The overall permittivity of the fixed bed of the Fischer-Tropsch may be more than $1 \times 10^{-15}$ m.

The overall permittivity of the fixed bed of the Fischer-Tropsch may be more than $1 \times 10^{-16}$ m.

The fixed bed of Fischer-Tropsch catalyst is arranged in a cylindrical form.

BRIEF DESCRIPTION OF THE DRAWINGS

Embodiments of the present invention will now be described, by way of example only, with reference to the accompanying drawings in which.

BRIEF DESCRIPTION

Generally speaking, the present invention resides in the provision of a Fischer-Tropsch reactor that incorporates forced flow through a small pore catalyst and high levels of heat transfer that is able to operate with high levels of catalyst effectiveness.

A novel Fischer-Tropsch reactor that incorporates forced flow through the small pore, thick catalyst layer, monolith catalyst and high levels of heat transfer that is able to operate with high levels of catalyst effectiveness.

Figure 1A:
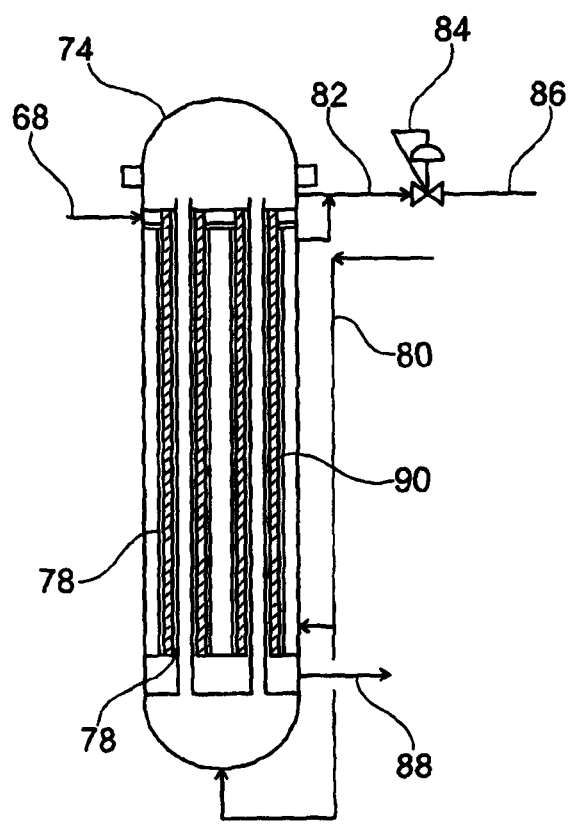
FIG. 1a is a Fischer-Tropsch reactor according to an embodiment of the present invention where the reactor contains heat transfer tubes which are fed with water via steam recovered through a line.
Figure 2A:
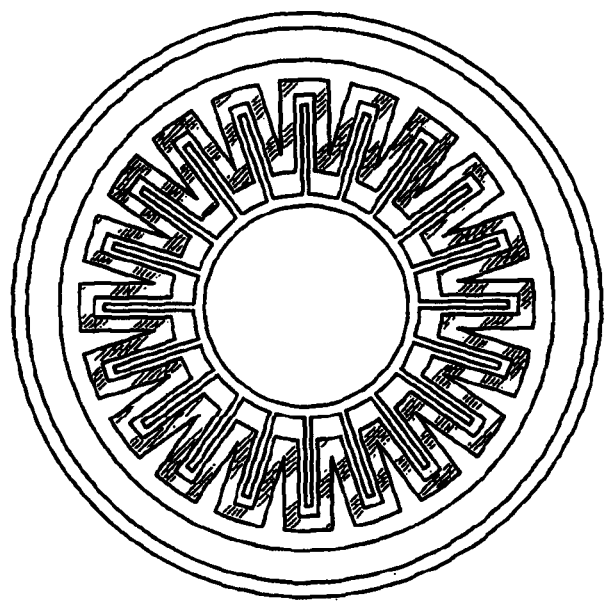
FIGS. 2a to 2f are representations of catalyst pore structures according to further embodiments of the present invention.
Figure 2A:
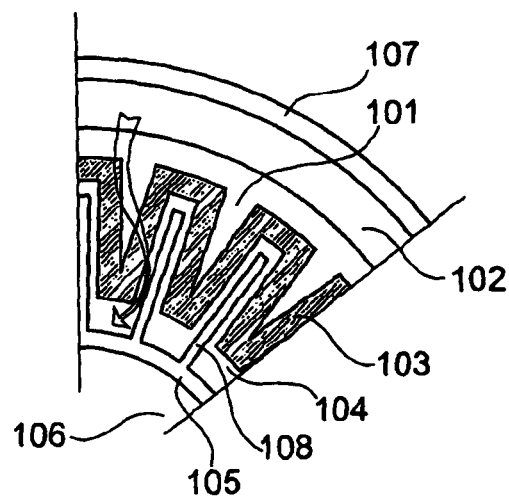

The apparatus as shown in the figure comprises:
a) A syngas inlet chamber connected to one or more catalyst supports by a gas tight seal
b) A porous catalyst support upon which is deposited a continuous layer of cobalt containing catalyst
c) A catalyst layer containing particles with a hydraulic mean diameter of less than 500 micron through which substantially all of the syngas must pass
d) A product gas outlet chamber connected to one or more catalyst supports such that the unreacted gas and products pass through the catalyst layer and collect in this chamber
e) High heat transfer is provided by the passage of a heat transfer fluid close to the catalyst support, within a secondary pressure containing chamber and/or by direct contact of the heat transfer fluid with the catalyst body
f) Where gas distribution through the catalyst body is maintained by the presence of a catalyst support structure that contains substantially no catalytic material within the pore structure Specific Embodiment In FIG. 1a The Fischer-Tropsch reactor 74 contains heat transfer tubes 78 which are fed with water via line 80 with steam recovered through a line 82. The pressure on heat exchange tubes 78 is controlled by a back pressure valve 84 in line 82, so that the temperature in the reactor 74 can be controlled. The supported bed of catalyst, 90 within the reactor 74 is shown in more detailed cross section in one embodiment in FIG. 2a and comprises porous tubes, 201 on which a layer of catalyst particles, are deposited. The catalyst particles are typically 200 microns in diameter that and form a bed of catalyst, 103 that is typically 1 mm deep. The support for the catalyst is shaped in a form such as a star shape as shown in FIG. 2a such that, examining the cross section of the bed, the internal perimeter of the bed is greater than the perimeter of the circle within which it can be inscribed. The small bed depth and folding of the bed allows use of a low permeability catalyst bed, typically less than $5 \times 10^{-15}$ m, while allowing a high volumetric concentration of catalyst and formation of a large surface area to be presented to a heat transfer surface or fluid. The folding of the catalyst bed also produces a thinner layer of catalyst which allows used of a lower thermal conductivity of catalyst and support. The supported catalyst is held in close proximity to a heat transfer tube, 105, typically within 5 mm and may be operated with substantial parts of the catalyst in thermal contact with the heat transfer section. The tube 105 is shown with a finned structure, 108, to extend the heat transfer surface area and improve thermal contact with the catalyst. In operation the synthesis gas mixture is introduced into void space 102 bounded by the external heat transfer surface 107 which may form a pressure shell. The gases pass through the porous structure 101, which typically has pores in excess of 1000 nm to the catalyst bed 103 where the pore structure is significantly smaller. The movement of the gas through the catalyst bed enables a high catalyst effectiveness to be maintained. The product and gases are then collected in chamber 104. Within chamber 106 there is a heat transfer mechanism that maintains the wall 105 at the desired reaction temperature. Such mechanisms for control of the heat transfer surface include the boiling of water, the circulation of a hydrocarbon or the use of specialist heat transfer fluid. A variation of this embodiment would be to operate in the absence of the heat transfer surface 107. This would have the benefit of making the reactor more compact, but reduces the heat transfer effectiveness of the reactor design.

Figure 1B:
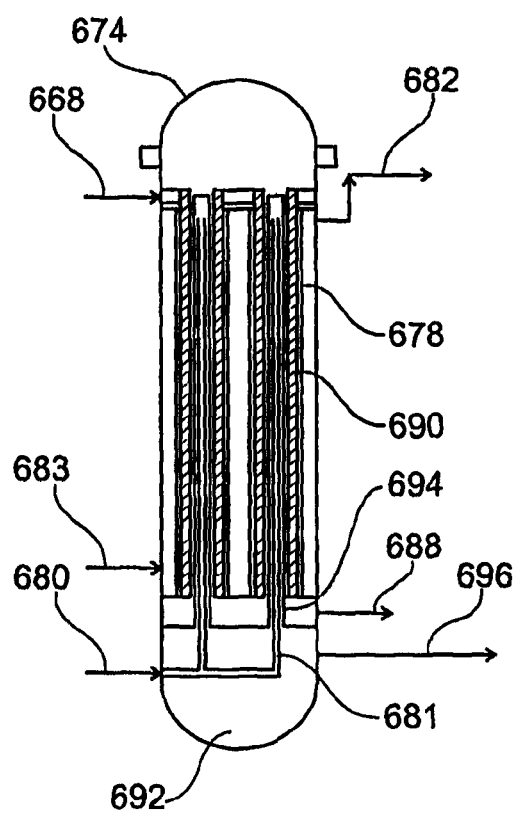
FIG. 1b is a Fischer-Tropsch reactor according to a further embodiment of the present invention where the reactor has a bayonet arrangement of the heat transfer tubes.

A second embodiment of the reactor, shown as a variation in the reactor 574 is shown in FIG. 1b. A bayonet arrangement of the heat transfer tubes is used in which water is fed through line 680, passes though the manifold 681 to the far end of the interior of the heat transfer tube 694. The heat transfer tubes 694, remove the heat of reaction away to a section of the reactor 692 and exits the reactor through line 688. The syngas is fed through line 668, passes through the supported catalyst 690 and additionally contact the heat transfer surface 678. Heat from the reactor is additionally removed by the contact of the water, fed into the reactor through line 680, with the surface 678 and leaving the reactor through the line 682.

Figure 2B:
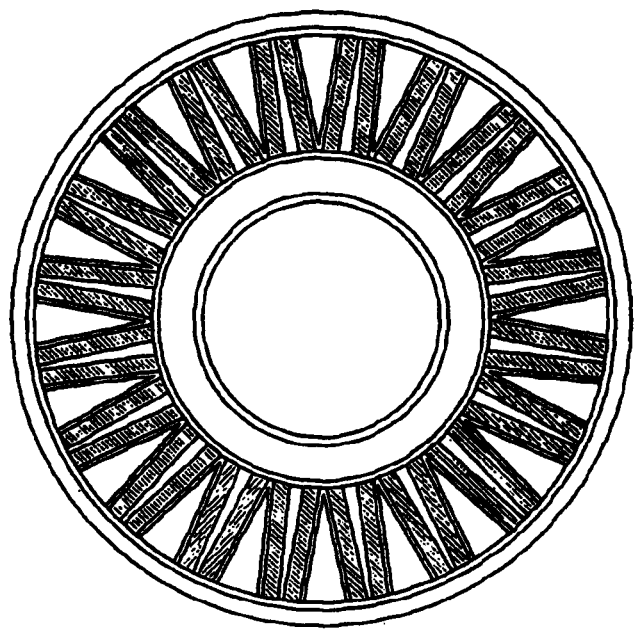
Figure 2B:
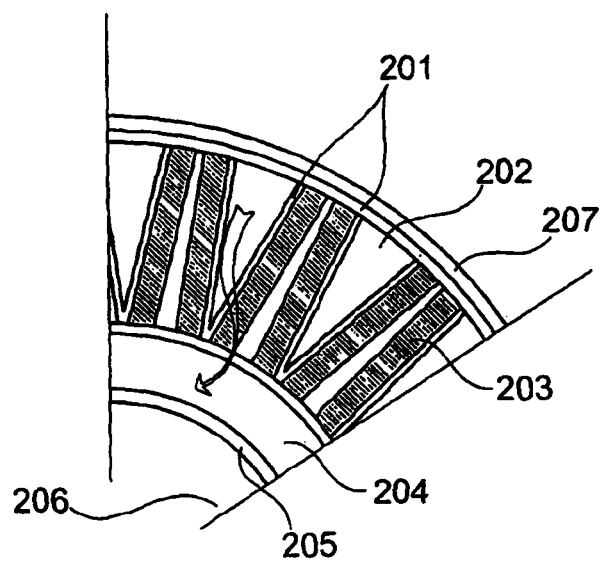

A variation in the arrangement of the supported bed of catalyst that can be used in the first two reactor embodiments also utilising forced flow through the catalyst pore structure is shown in FIG. 2b. In this arrangement the support of the catalyst, 201 is a porous metallic, thermally conducting structure which is in thermal contact with the heat transfer surface 207. The synthesis gas is introduced into chamber 202 and then forced by pressure through the catalyst bed 203 and porous or perforated metallic wall 201, collecting in chamber 204. A further heat transfer surface is provided, 205, within which heat transfer fluid 206 is circulating.

Figure 1C:
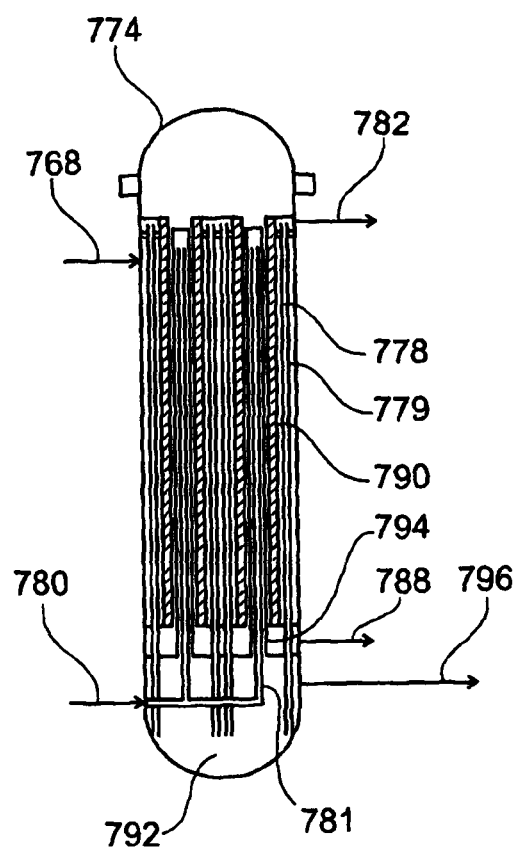
FIG. 1c is a Fischer-Tropsch reactor according to a further embodiment of the present invention where the reactor has a heat transfer tube that is located in the interstitial space of the closekj packed catalyst structures.

A third reactor embodiment is shown in FIG. 1c in which the cylindrical heat transfer surface 694 in FIG. 1b that surrounds the catalyst body is replaced with a heat transfer tube that is located in the interstitial space of the close packed catalyst structures. The location of these additional tubes are seen as 507 in FIG. 2e. In the FIG. 1c water is introduced through line 780 and is fed through the manifold system 781 to the bayonet tubes 794. The water then collects in chamber 792 and exits through line 796. Additionally the water may also exit from chamber 792 through the additional heat transfer tubes 779 and exit from the reactor through line 782.

Figure 1D:
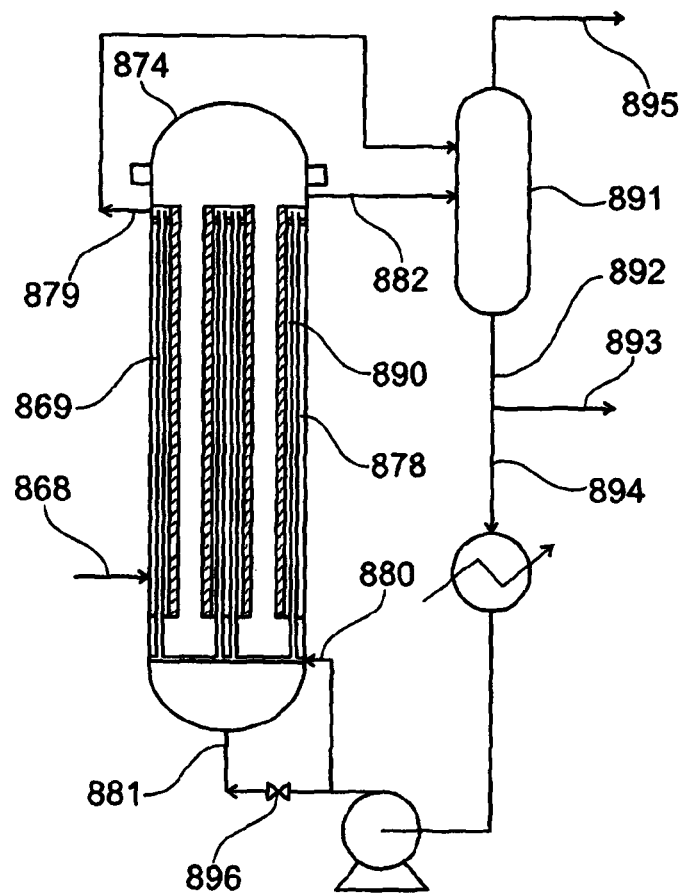
FIG. 1d is a Fischer-Tropsch reactor according to a further embodiment of the present invention where in the reactor hydrocarbon is circulated in direct contact with the internal surface of the catalyst.
Figure 1E:
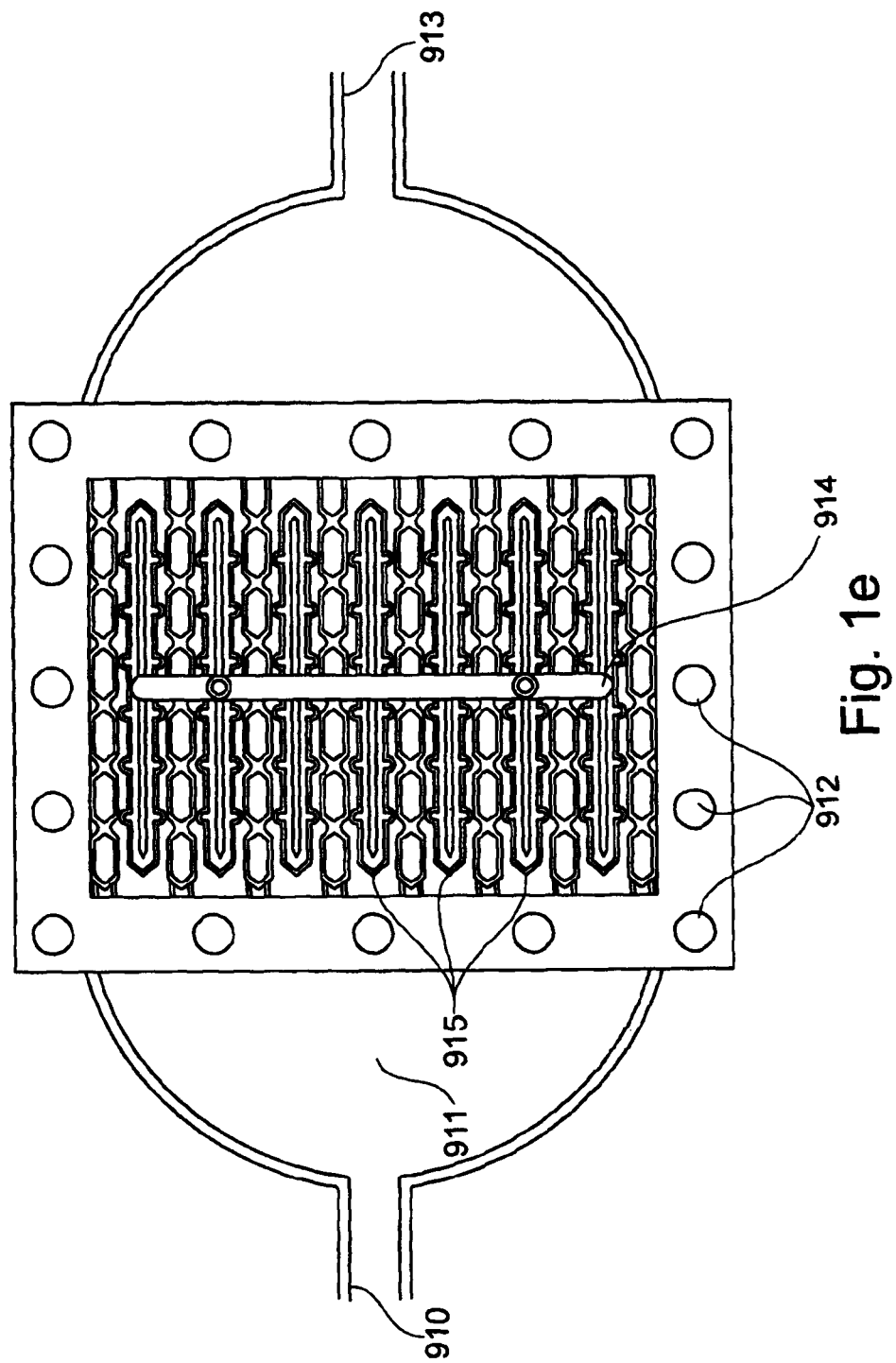
FIG. 1e is a Fischer-Tropsch reactor according to a further embodiment of the present invention in which the components of the reactor are arranged in a layer structure.

FIG. 1d shows a variation in the catalyst configuration that is shown incorporated in the fourth reactor embodiment 774, FIG. 1c. In this variation a monolith type of support 501 is utilised except that the syngas for reaction passes from chamber 502 through the support 501 and through the catalyst layer 503 and into the channels 509. The forced flow enables thicker layers of catalyst to be utilised. The products and excess syngas is able to collect in chamber 504 through breaks at intervals in the monolith structure. The extended heat transfer surface 505 and the additional heat transfer tube 507 removes the heat of reaction.

A fourth embodiment of the reactor is shown in FIG. 1d which is a variation of the fourth embodiment in which the bayonet style of heat transfer surface 794 is removed and in its place hydrocarbon is circulated in direct contact with the internal surface of the catalyst. The syngas is fed into the main chamber 869, which is essentially dry, through line 868. This syngas then passes through the catalyst body 890 and contacts the circulating fluid entering through line 881. The two phase mixture of liquid hydrocarbon, containing liquid hydrocarbon products and gaseous hydrocarbon products and unreacted gases exits through line 882 and passes to separator 891. Additionally hydrocarbon heat transfer fluid also enters the heat transfer tubes 878 and exits the reactor through line 879 and passes to the separator 891. Gaseous products and unreacted gas exit the separator through line 895. Liquid products and circulating hydrocarbon exit the separator 891 through line 892, from which a product draw is taken through line 893. The remaining liquid hydrocarbon is cooled, pressurised and returned to the reactor through lines 881 and 880. Line 881 can be isolated during start-up using valve 896 to ensure that the chamber 869 remains dry. Sufficient pressure drop across the catalyst structure is maintained to ensure flow of coolant hydrocarbon through the structure 890 does not occur.

Figure 2C:
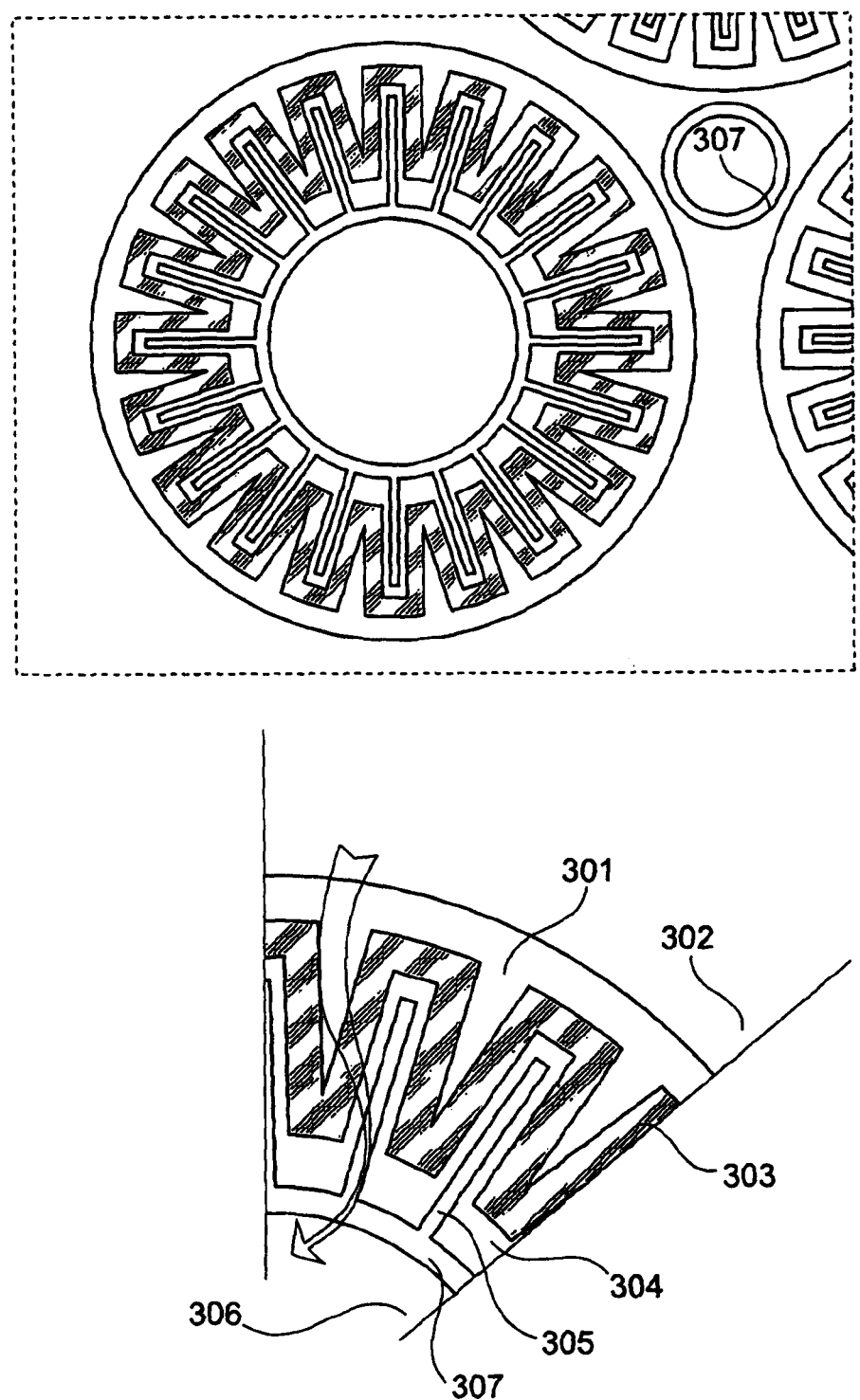

FIG. 2c shows a variation in the catalyst structure that is suitable for the fifth embodiment of the reactor 874 such that the majority of the heat of reaction passes to the hydrocarbon fluid in chamber 306. The FIG. 2c illustrates the chamber 302 into which the syngas is fed and maintained at desired reaction temperature through thermal contact with the heat transfer surface 307. The gases then pass through the support structure 301, the catalyst layer 303 into the void space 304. An optional porous structure 307 is shown which guides the majority of the circulating hydrocarbon flow through the center of the tube, therefore reducing any mechanical attrition of the catalyst whilst at the same ensuring good thermal contact of the heat transfer fluid with the catalyst.

Furthermore the gas fraction within the chamber 306 may be sufficient to lower the overall bulk density of the fluid such that recirculation of the hydrocarbon fluid may occur, either within the reactor or with an external loop in a similar manner to a thermosyphon mechanism of a heat exchanger of a boiler where the reduced overall density of liquid due to the presence of vapour spaces causes the fluid to be displaced by cooler liquid continuous fluid. External cooling of the fluid could similarly be performed without the use of an external pump.

Figure 2D:
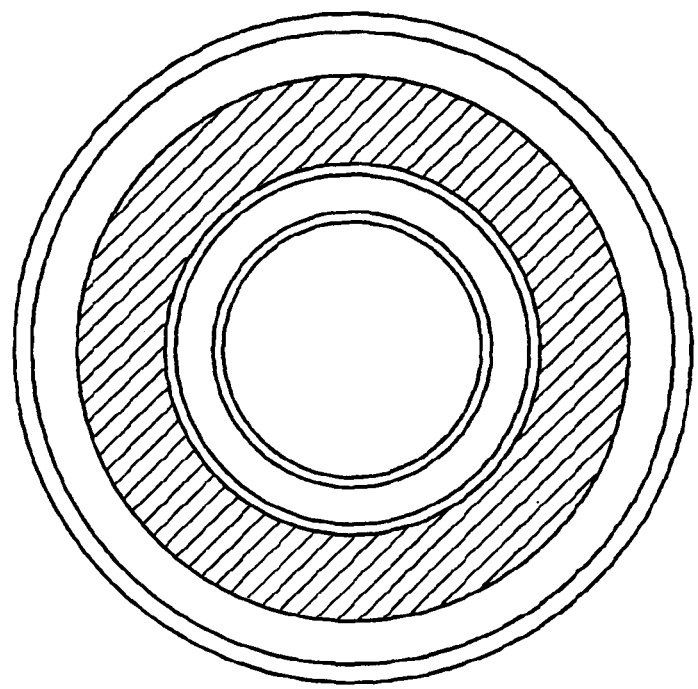
Figure 2D:
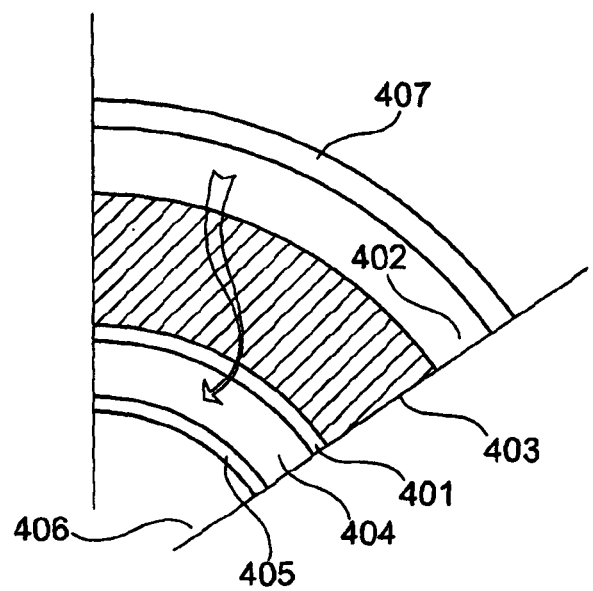
Figure 2E:
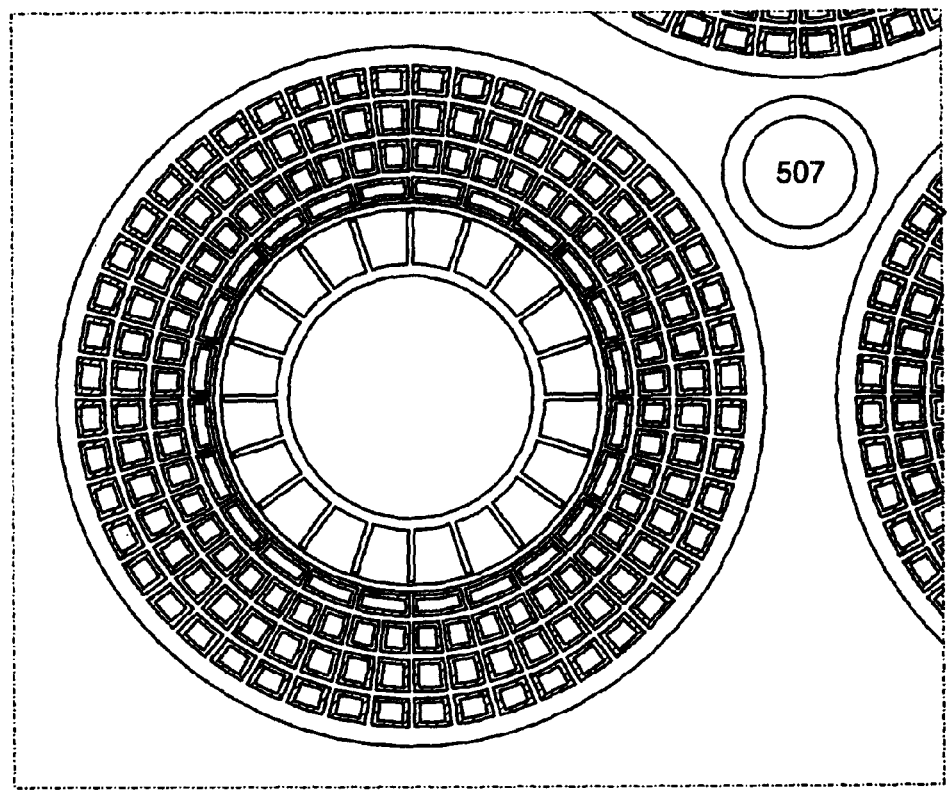
Figure 2E:
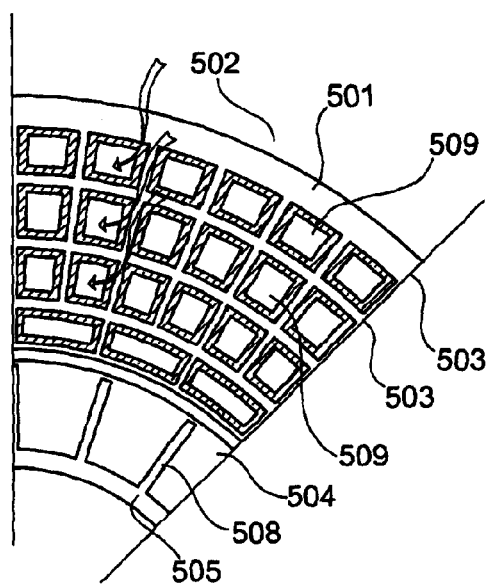

A further variation of catalyst structure is shown in FIG. 2d in which a high permeability supported bed of catalyst, 403 is supported on a mechanically strong porous support, ceramic or metallic, 401. The synthesis gas passes from the external chamber 402 to the internal chamber 404. In this embodiment a heat transfer surface, 405 and 407 is provided both internal and external to the fixed bed.

Figure 2F:
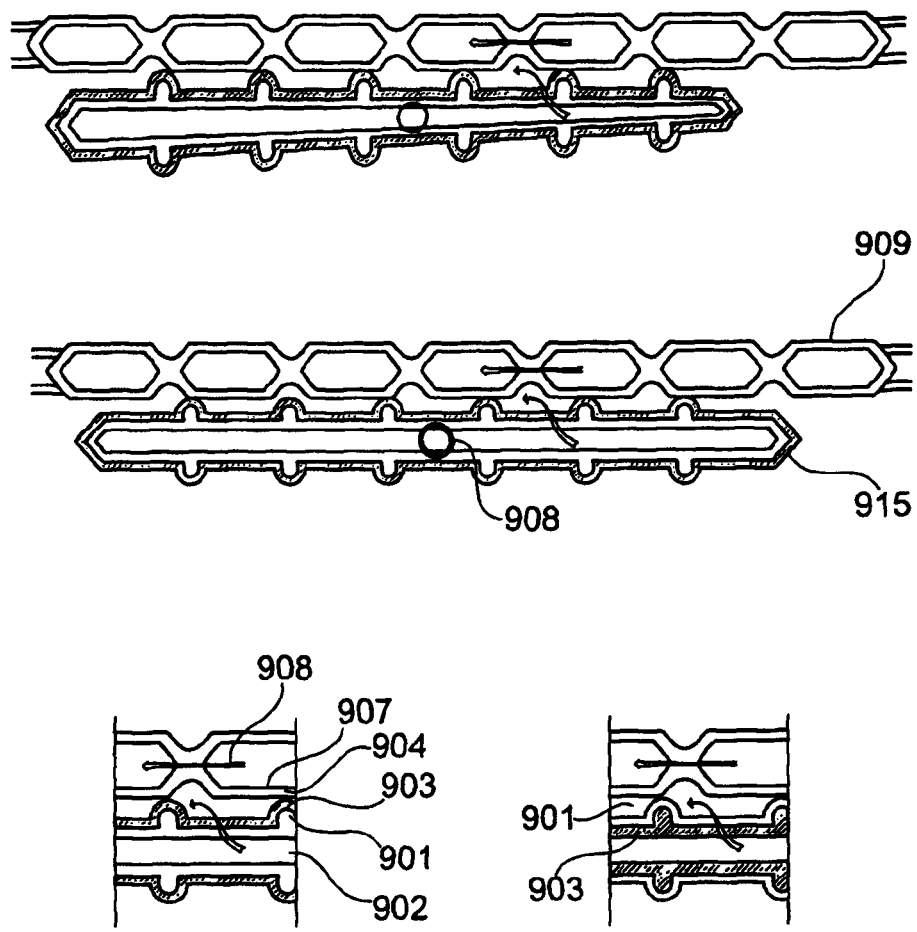

A fifth embodiment of the reactor is shown in figure if in which the components of the reactor are arranged in a layer structure. Details of the arrangement of the catalyst are shown in FIG. 2f. The catalyst layer 903 is supported on a porous support 901 forming a flat chamber 902. The syngas is fed into the chamber 902 through the nozzle 908 and is forced to pass through the catalyst layer 903. Heat transfer is provided by intimate contact of the catalyst layer with a plate structure 909 that may be constructed by a combination of welding and spot welding to produce a pressure vessel. The structure may also be produced by brazing of plates, well known in the art of heat exchanger manufacture. The entire assembly can be held together either within a frame, allowing a gasketed structure to hold the pressure. Alternatively the heat exchange elements may be brazed together as shown in figure if leaving sufficient gaps, typically around 10 mm for the subsequent insertion of catalyst. The coolant is fed into nozzle 910 and distributed through the header 911 into the individual heat exchange panels 909 and then exits through nozzle 913. The syngas is fed through the service plate, not shown, and into the manifold 914 distributing the gas to the catalytic plates 915. The service plate is held in place by bolting located in through the holes 912. The entire assembly is arrange with the planar catalyst structures 915 and heat transfer structures 909 in the vertical orientation such that any liquid forms drop to the base of the chamber 904 for ready removal.

According to the present invention an apparatus has been provided that enables high productivity powder catalyst formulations to be supported in a Fischer-Tropsch reactor producing a high volumetric catalyst loading and high heat transfer capability. The flow-through arrangement of the catalyst layer produces a reactor that gives high mass transfer capability without the tendency to wetting and channeling and without the limitations on catalyst formulations producing a reactor that is overall compact, reduced cost and more productive than other technology combinations.

Whilst specific embodiments of the present invention have been described above, it will be appreciated that departures from the described embodiments may still fall within the scope of the present invention. For example, any suitable type of fixed bed reactor may be used.

EXAMPLE SECTION

A catalyst powder was prepared by the following method:

A high surface area gamma alumina with 170 m2/g of surface was impregnated with cobalt and ruthenium using the incipient wetness technique and then dried and calcined to produce a catalyst powder containing 20 wt % cobalt and 0.5 wt % Ruthenium with a dispersion of approximately 8%, as determined by hydrogen chemisorption.

A suspension of this material was then prepared by agitation of the catalyst powder with a mixture of distilled water, hydroxyethylcellulose and an additional portion of high surface area gamma alumina to act as binder. This suspension was then coated onto a low surface area porous ceramic structure made from 75% titania, 25% alumina with a characteristic pore size of around 6000 nm. The particle size of the suspended solid components and the viscosity of the suspension was chosen such that penetration of the solid components into the low surface area ceramic structure was not appreciable.

The catalyst powder is coated as a surface layer onto the porous ceramic either on the outer surface, 5, or on the inner surface, 6 in FIG. 4a. The porous ceramic cylinder, 7 contains internal structure and is shown in more detail in cross section in FIG. 4b. The amount of inner surface has been extended by the use of a channelled structure; the channels, 10, are shown in cross section in FIG. 4b.

Figure 3:
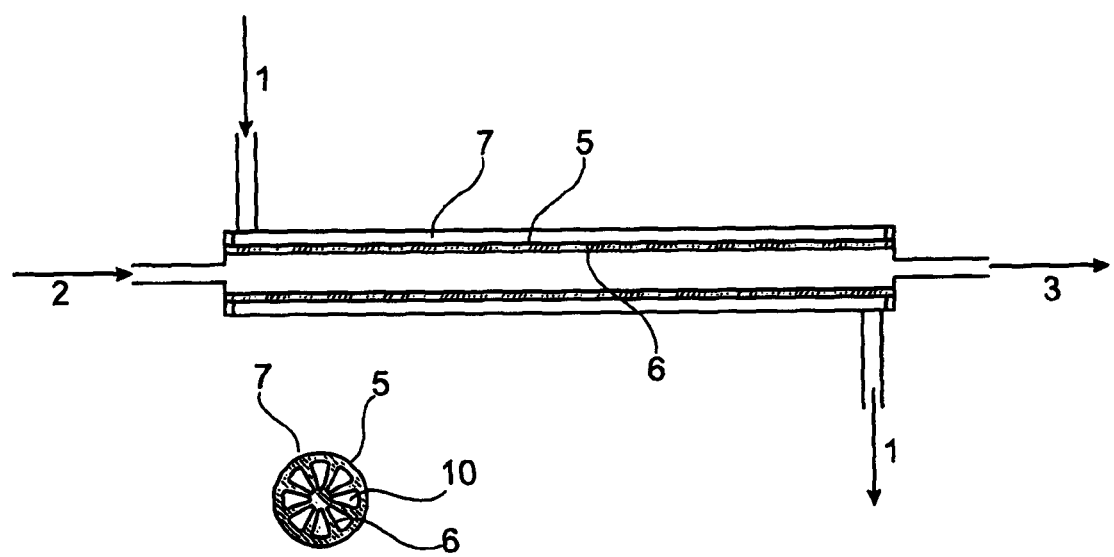
FIG. 3 is a representation of reactor according to a further embodiment of the present invention.

After calcination at 250 deg C. in air for 10 hours the ceramic cylinder was then placed within a reactor as shown schematically in FIG. 3. Reduction of the catalyst takes place under flowing hydrogen for 14 hours at 350 deg C. and 1 barg the activity of the catalyst structure is determined from the consumption of syngas at temperatures between 190 and 220 deg C. The inlet gas syngas (H2/CO/N2, 58/28/14) is introduced at point 1 or point 2 and the product gas and liquids are withdrawn through point 3 or point 4. Only one inlet and one outlet are used. The conversion is determined from a measurement of the gas flow rate in and out of the reactor and analysis of the gas by GC.

Example 1

9.2 g of catalyst powder was washcoated to the external surface of the porous cylindrical support. After calcination and reduction the layer thickness was determined to be approximately 0.6 mm. The catalyst was then loaded in a reactor and tested for activity at 210 deg C and 15.3 barg with an inlet flow of 1.1 L(n) per min of syngas. The performance is shown in table 1.

TABLE 1

| Flow configuration | Temperature/ deg C. | Catalyst productivity/ gHC/gCo.h | Selectivity to CH4 |
|---|---|---|---|
| 1 in, 3 out. Flow through | 210 | 0.64 | 15% |
| 2 in, 4 out. Flow through | 210 | 0.70 | 11% |
| 2 in, 3 out. Flow past | 210 | 0.33 | 31% |
| 1 in, 4 out. Flow past | 210 | 0.51 | 22% |

This shows how forcing gas flow through the porous support and catalyst layer improves the activity of the catalyst and decreases the amount of methane made by the catalyst. This is consistent with improved mass transfer in the catalyst pores.

Example 2

12.9 g of catalyst powder was washcoated to the external surface of the porous cylindrical support and 12.1 g of catalyst was washcoated to the inside of the support channels. After calcination and reduction the layer thickness was determined to be approximately 0.8 mm on the outside of the support and approximately 0.5 mm on the inside surface giving a total layer thickness in excess of 1 mm. The catalyst was then loaded in a reactor and tested for activity at 210 deg C. and 15.3 barg with an inlet flow of 1.1 L(n) per min of syngas. The performance is shown in table 2.

TABLE 2

| Flow configuration | Temperature/ deg C. | Catalyst productivity/ gHC/gCo.h | Selectivity to CH4 |
|---|---|---|---|
| 1 in, 3 out. Flow through | 220 | 1.17 | 7.6% |
| 2 in, 3 out. Flow past | 220 | 0.53 | 18.1% |
| 1 in, 3 out. Flow through | 220 | 1.11 | 6.3% |
| 2 in, 4 out. Flow through | 220 | 0.95 | 8.9% |

This shows how forcing gas flow through the porous support and catalyst layer improves the activity of the catalyst and decreases the amount of methane made by the catalyst. This is consistent with improved mass transfer in the catalyst pores. The effect is more marked with a thicker catalyst layer.

The invention claimed is:

1. A reactor for converting synthesis gas in a Fischer-Tropsch process using a supported catalyst to produce heavy paraffins, wherein the catalyst is supported on a distinct porous structure through which the synthesis flow is forced and the catalyst layer has a thickness of more than 200 microns, wherein the catalyst support forms a distinct single internal surface with a geometric surface area greater than a cylinder within which it can be inscribed; wherein the catalyst support forms a planar cavity and
   a. wherein the planar cavity has at least one nozzle inlet;
   b. wherein the planar cavity contains catalyst substantially covering at least one of the outer or inner surface forming the cavity; and
   c. wherein a heat transfer surface adjacent to the planar cavity is formed into a pressure vessel from the edge welding of plates, by brazing or by compression within a frame or diffusion bonding of a channelled structure.

2. A reactor for converting synthesis gas in a Fischer-Tropsch process using a supported catalyst to produce heavy paraffins wherein the catalyst is supported on a distinct porous structure through which the synthesis flow is forced and the catalyst layer has a thickness of more than 200 microns, the reactor comprising a heat transfer device, wherein the heat transfer is within a cylindrical catalyst support provided by a bayonet arrangement of heat transfer tubes; and wherein a continuous layer of less than 1 mm thick with a pore size of less than 1000 nm substantially free of cobalt is fixed to the catalyst support.

3. A reactor for converting synthesis gas in a Fischer-Tropsch process using a supported catalyst to produce heavy paraffins, wherein the catalyst is supported on a distinct porous structure through which the synthesis flow is forced and the catalyst layer has a thickness of more than 200 microns, wherein the catalyst and porous support is placed between heat transfer tubes of less than 60 mm diameter; and wherein a cobalt catalyst within the Fischer-Tropsch Reactor is supported by a porous ceramic structure which has a characteristic pore size greater than 500 nm.

* * * * *